United States Patent [19]

Gossman

[11] Patent Number: 5,052,510

[45] Date of Patent: Oct. 1, 1991

[54] HYBRID TYPE VIBRATION ISOLATION APPARATUS

[75] Inventor: William E. Gossman, Silver Spring, Md.

[73] Assignee: Noise Cancellation Technologies, Inc., Linthicum, Md.

[21] Appl. No.: 480,841

[22] Filed: Feb. 16, 1990

[51] Int. Cl.[5] ............................................. F16M 13/00
[52] U.S. Cl. .................................... 180/300; 180/312; 180/902; 248/550; 267/140.1
[58] Field of Search ............... 180/300, 299, 292, 312, 180/902; 248/550, 638, 654; 267/140.1 A, 140.1 AE, 140.1 E, 219

[56] References Cited

U.S. PATENT DOCUMENTS

| | | | |
|---|---|---|---|
| 4,624,435 | 11/1986 | Frelldenberg | 180/300 |
| 4,802,648 | 2/1989 | Decker et al. | 248/550 |
| 4,869,474 | 9/1989 | Best et al. | 180/902 |
| 4,887,699 | 12/1989 | Ivers et al. | 248/550 |

FOREIGN PATENT DOCUMENTS 0075829 4/1984 Japan ................................. 180/300

Primary Examiner—David M. Mitchell

[57] ABSTRACT

A hybrid type vibration isolation mounting apparatus for supporting a first member at a second member, and including a passive vibration absorbing device, such as a typical rubberized engine mount, located between the first and second members, and an active vibration actuator for applying counter vibration isolation forces in parallel in response to the detected relative vibration of the first and second members, wherein the actuator is located on a support mount frame attached to the second member. The support mount frame provides a structure for the actuator force application, with continuous transfer of static loads between the first and second member being provided by the passive device. In its preferred embodiment, the apparatus is utilized in conjunction with vehicle engine mounts wherein the first member comprises the engine and the second member comprises the vehicle frame.

14 Claims, 3 Drawing Sheets

HYBRID TYPE VIBRATION ISOLATION APPARATUS

BACKGROUND OF THE INVENTION

The present invention relates to vibration isolation apparatus included in means for supporting and securing a first member to a second member. There are many commercial environments where a first member needs to be supported by a second member, with at least one of the members being vibrated such that it is desirable to attenuate the transmission of the vibration induced forces therebetween. Attenuation of the vibration induced force transmission minimizes structural wear on the respective members and reduces undesirable noises generated by such vibrations.

One particular environment contemplated by the present invention is the environment of internal combustion engine supports in vehicles, so-called engine mounts. The invention also contemplates active vibration isolation mounting arrangements in environments involving vibrating machinery that must be supported, including compressors, generating plants, machine tools, and the like.

Almost since the advent of the use of internal combustion reciprocating piston engines to power automotive vehicles, some type of elastic cushioning mount has been utilized to attenuate the transfer of vibrations between the vehicle frame and the engine. Typically, such engine mounts include rubber cushions or bushings situated between clamping flanges that are bolted to the vehicle frame and engine brackets to hold the engine in place. These elastic cushioning mounts can be generally referred to as "passive" mounts in that they tend to attenuate the transfer of vibration forces by passively generating reactive forces resisting relative movements of the parts. FIG. 1, described below, schematically depicts a prior art passive engine mount arrangement.

In the last five years, there have been suggestions to utilize so-called "active" vibration isolation mounts for supporting vehicle engines by a vehicle frame. Two SAE Technical Papers presented at the International Congress and Exposition, Detroit, Michigan, Feb. 29--Mar. 4, 1988 relate to such mounts—Paper 880074, titled: ACTIVE FRAME VIBRATION CONTROL FOR AUTOMOTIVE VEHICLES WITH HYDRAULIC ENGINE MOUNTS, by P. L. Graf et al and Paper 880075 titled: OPEN-LOOP VERSUS CLOSED-LOOP CONTROL FOR HYDRAULIC ENGINE MOUNTS, by R. Shoureshi et al. The active vibration isolation mounts referred to in the above-noted SAE Technical Papers 880074 and 880075 provide for the generating and application of counter, opposite vibration forces responsive to the vibration experienced. In these papers, a hydraulic actuator with fluid pressure chambers at opposite sides of a diaphragm is proposed as an active vibration isolation mount. A support bushing is carried by the diaphragm. This support bushing in turn is connected to apply counter forces to a member being vibrated in response to changes in actuating fluid pressure applied to the fluid chambers. FIG. 3, described below, schematically depicts such a prior art active engine mount arrangement.

The active vibration isolation mounts such as mentioned above are useful in that they effectively reduce the transmission of the vibration force movements between the elements, and thus minimize the need for passive supports and provide for the response flexibility that a microprocessing unit can provide to adjust to changes in vibration frequency and amplitude patterns.

However, a problem with some of these prior art active vibration isolation systems is that a failure of the actuator may result in a "hard" short between the bottom of the mount and the vibration disturbance. Further, arranging the actuator in series with the force transfer between the respective vibrating members requires an extremely sturdy actuator construction to accommodate the forces involved.

An example of an actuator for an active vibration isolation system is a conventional hydraulic cylinder. Such a cylinder can fail, for example, by having the relatively movable metal parts freeze-up (stick). In such a case, the hydraulic cylinder becomes a "hard" short to vibration forces between the respective parts to which it is connected. An example of a hydraulic actuator can be found in an article entitled, "Counter Vibrations Smooth Copter Ride", by Tom Shelley, published May, 1988. In that article an engine mounting arrangement for a helicopter engine is described including a hydraulic actuator for an active vibration cancellation system mounted concentrically within an elastomeric passive mount. In the event that the hydraulic actuator (a hydraulic cylinder) fails, a "hard" short will form between the helicopter engine and its frame.

An object of the present invention, therefore, is to design an active vibration isolation mount which avoids the problem of such a "hard" short.

Another object of the present invention is to provide for a sufficiently strong mount that can be operated in an active mode while remaining out of the static load path between relatively vibrating members.

SUMMARY

According to the present invention, the above and other objects are achieved by providing a hybrid type vibration isolation mounting apparatus for supporting a first member at a second member, which includes: a passive vibration absorbing device, such as a typical rubberized engine mount, located between the first and second members, and an active vibration actuator for applying counter vibration isolation forces in response to the detected relative vibration of the first and second members, wherein the actuator is located on a support mount frame attached to the second member, which support mount frame serves as a back-up for the actuator force application, with continuous transfer of static loads between the first and second member being provided by the passive device.

With the arrangement of preferred embodiments of the present invention, the advantages of both the passive mount and the active mount are combined. Further, since the active vibration actuator operates on the passive device mount, without being connected in series in the power transfer between the first and second members through the passive mount, power for the actuator need respond to only the vibration forces without supporting the total load transfer.

In especially preferred embodiments, the mounting arrangement is adapted for use with vehicle engine mounts. A plurality of separate passive engine mounts are disposed between the engine and the vehicle frame. A respective active vibration isolation unit is disposed at a respective passive mount. In preferred embodiments, the isolation units include an actuator support frame which is anchored at the engine frame, which actuator support frame serves to support a hydraulic actuator so as to act at the respective passive mounting point. Thus, the active vibration isolation forces are applied at the respective passive mounting connection, with only limited involvement in the static force transfer between the engine and the vehicle frame.

In other preferred contemplative embodiments, the active actuator is applied in the region of a coil spring or other passive shock absorber which passively elastically supports a vehicle wheel with a vehicle support frame. Again in these contemplated embodiments, the active actuator acts on the passive support mount, but without any significant interception of the static force transfer between the wheel being supported and the vehicle support frame.

Other objects, advantages and novel features of the present invention will become apparent from the following detailed description of the invention when considered in conjunction with the accompanying drawings.

DETAILED DESCRIPTION OF THE DRAWINGS

Figure 1:
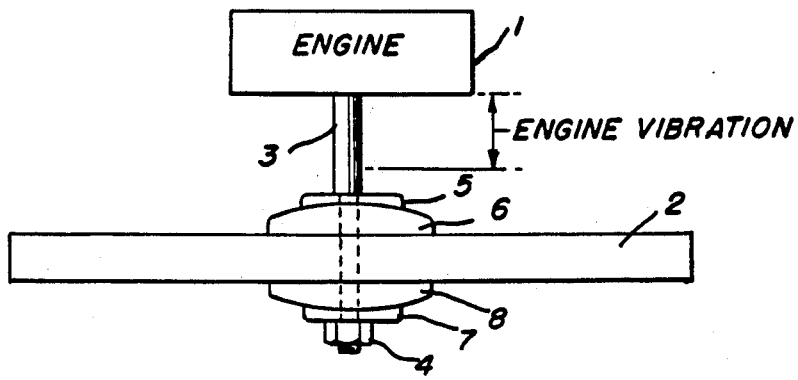
FIG. 1 is a schematic view depicting a prior art passive engine mount arrangement.

FIG. 1 schematically depicts a prior art passive engine mount arrangement. An engine 1 is attached to a seating or vehicle frame member 2 by way of a bolt 3 which extends through the frame part 2 and has a threaded nut 4 attached at the bottom thereof. A first clamping flange 5 is supported at the bolt 3 and engages over the top of an upper rubber-elastic cushion 6. A second flange 7, movable with the nut 4 along the axial length of the bolt 3, is supported against a lower rubber-elastic cushion 8. The elastic cushion members 6 and 8 are clamped against the frame part 2 by the nut 4 and the clamping flanges 5, 7. During vehicle operation, the engine vibrations (and the frame vibrations induced by the road surface) are transmitted between the engine 1 and frame part 2 with interposition of the elastic members 6, 8, thereby passively cushioning the impact of these vibrations. In this arrangement, there is no attempt to actively prevent the further transmission of the vibration forces, merely the passive absorption thereof.

Figure 2:
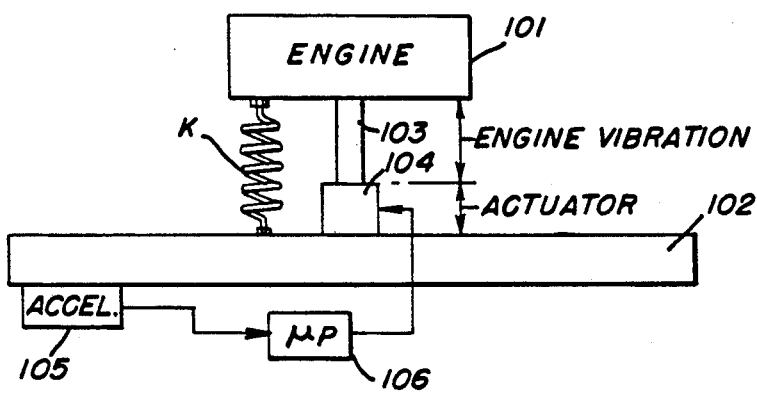
FIG. 2 is a schematic view depicting a prior art active engine mount arrangement.
Figure 3:
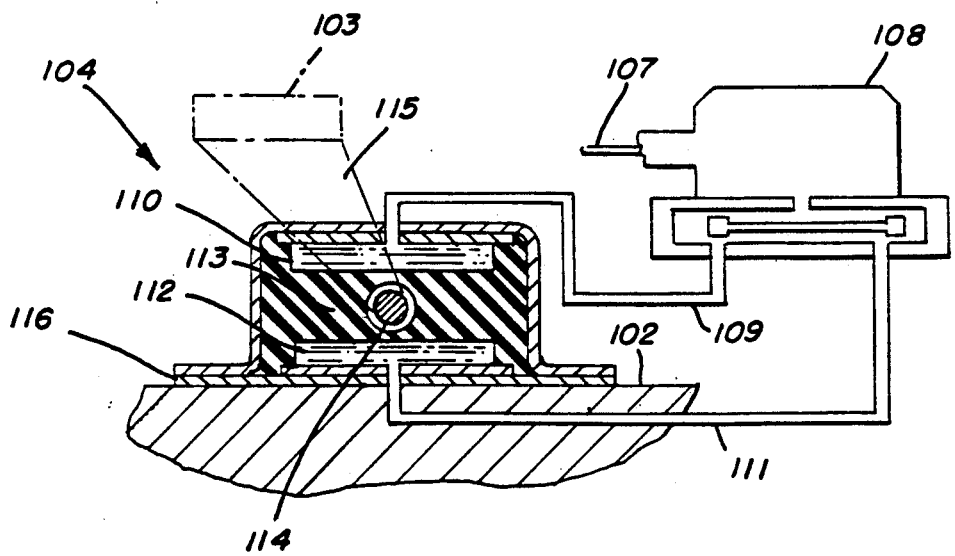
FIG. 3 is a schematic depiction of a prior art actuator per se for use in the FIG. 2 arrangement and in the FIG. 4 embodiment of the present invention.

FIGS. 2 and 3 schematically depict a prior art active engine mount, such as proposed in the above-noted SAE Technical Papers 880074 and 880075. Referring to FIG. 2, an engine 101 is supported at a frame member 102 by way of a bolt 103 with the interposition of an actuator 104. Actuator 104 is controlled to apply counter vibration force movements in response to detection of the vibration forces by way of an accelerometer 105 and a microprocessor control unit 106 which controls the actuator control input 107. Schematically depicted spring K represents a passive spring cushion mounting disposed spaced from the bolt 103 and actuator 104 for providing static load support for the engine and high frequency vibration isolation.

FIG. 3 schematically depicts the operation of the actuator 104, with the control signal 107 being fed to the servo valve 108, which in turn controls the pressure fluid supply by way of line 109 to the upper fluid reservoir 110 and by way of line 111 to the lower fluid pressure chamber 112. A diaphragm 113 is located between the upper and lower reservoirs 110 and 112 and carries with it a metal bushing 114 which is attached by way of bracket 115 to the engine support bolt 103. The metal mounting bracket 116 of the actuator 104 is secured directly to the seating or frame parts 102.

In operation of the active mount of FIGS. 2 and 3, counter forces are applied by the actuator 104 as a function of the detected vibration in the frame 102.

If the actuator were a conventional hydraulic cylinder in the FIG. 2 arrangement, such as the hydraulic cylinder of the aforementioned "Counter Vibrations Smooth Copter Ride" by Shelley, failure of the cylinder would form a "hard" short between engine 101 and frame 102. However, by using the FIG. 3 mount, the arrangement becomes fail safe. That is, with the FIG. 3 actuator, a "hard" short cannot form even if the hydraulic fluid should leak. This is due to the fact that diaphragm 113 is fabricated of resilient material and remains compliant. Therefore, use of the actuator of FIG. 3 results in a substantially fail safe arrangement.

Figure 4:
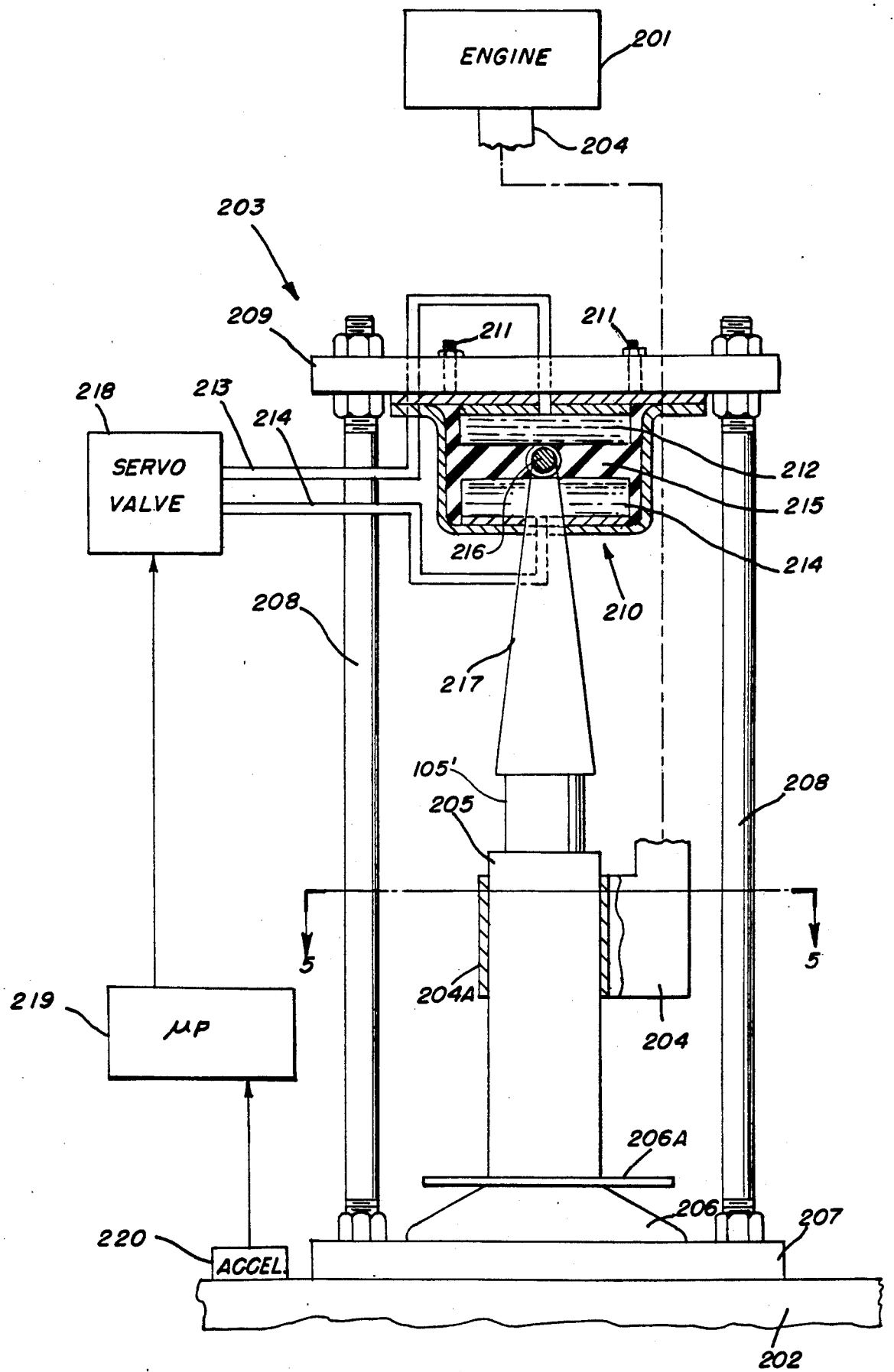
FIG. 4 schematically depicts a combination active and passive engine vibration isolation mounting arrangement constructed according to a preferred embodiment of the present invention.

A preferred embodiment of the present invention for use as an engine mount is schematically illustrated in FIG. 4. An engine 201 is supported on a vehicle frame member 202 by way of a schematically depicted active vibration isolation mount 203 constructed according to a preferred embodiment of the present invention. The engine 201 is coupled to and supported by an engine bracket 204 which in turn is connected to a mounting member 205 which rests on a passive mount 206. In practice, the bracket 204, mounting member 205 and passive mount 206 are constructed much as a conventional passive mount of the type depicted in FIG. 1, with a bolt, not shown, clamping connection to the frame 202 or to the active vibration mount bottom plate 207. The active vibration isolation mount structure 203 includes the bottom plate 207 connected by threaded rods or bolts 208 to a top plate 209 to thereby form a rigid frame structure with the top plate extending over the top of the mounting member 205. This frame 207, 208, 209 serves to support a hydraulic actuator 210 which is attached to the top plate 209 by bolts 211. The hydraulic actuator 210 is similar to the FIG. 3 prior art actuator arrangement, however, it is inverted so as to attach to the underside of the plate 209.

As with the FIG. 3 arrangement, the hydraulic actuator 210 includes an upper fluid chamber 212 connected to hydraulic control line 213 and a lower chamber 214 communicated with a control line 214. A diaphragm 215 separates the upper and lower chambers 212 and 214 and carries a support bushing 216 which is movable along with the diaphragm 215 in response to hydraulic control pressure applied via lines 213 and 214.

The support bushing 216 and diaphragm 215 is connected via active force transfer bracket 217 with the top portion 105' of the mounting member 205. The operation of the actuator 210 is controlled by a servo valve 218, which is in turn controlled by microprocessor unit 219 in response to detected vibrations via detector 220. The detector 220 is shown mounted on the frame 202.

Figure 5:
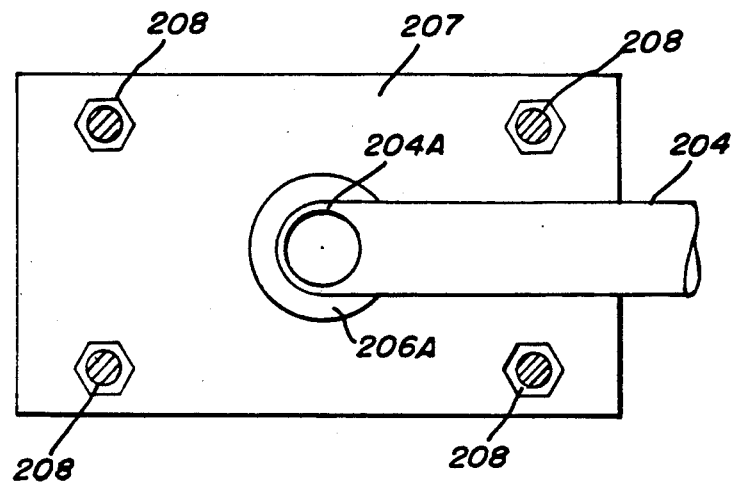
FIG. 5 is a schematic sectional view taken along the line V—V of FIG. 4.

FIG. 5 schematically depicts the orientation of the engine support bracket 204 and its attachment via connecting sleeve 204A at the mounting point or bolt 205. The top clamping plate 206A of the cushion 206 is disposed to symmetrically surround the mounting member 205. The active vibration support frame bolts 208 are disposed symmetrically around the mounting member 205 such that the vibration isolation forces applied to the mounting member 205 by the actuator elements 215, 217 are centrally applied.

Figure 6:
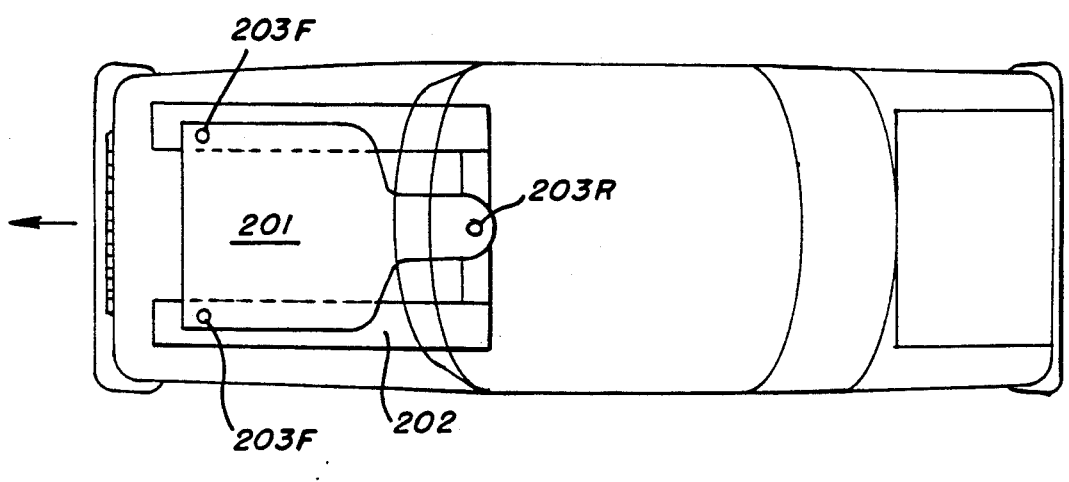
FIG. 6 is a schematic depiction of the location of the vibration isolation mounts for a vehicle engine.

FIG. 6 is a top plan schematic view depicting the location of the engine 201 with respect to the vehicle frame member 202, as well as the disposition of the engine support mounts and active isolation mounts 203 at the forward end of the engine and in a rearward point for supporting a transmission attached to the engine.

In certain preferred embodiments, the rear active vibration isolation mount 203R can be dispensed with and merely a passive connection without the active hydraulic actuator can be utilized, especially in engine mounting arrangements wherein a substantial majority of the engine/transmission unit weight is supported at the front mounting connections 203F.

Figure 7:
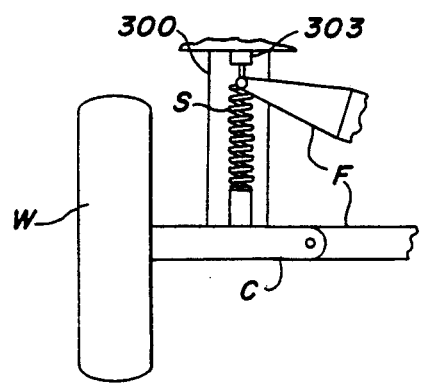
FIG. 7 is a schematic side view depicting a vehicle wheel suspension system with an active vibration isolation mounting arrangement constructed according to a preferred embodiment of the present invention.

FIG. 7 depicts another preferred embodiment of the invention wherein a vehicle wheel W is supported at a vehicle frame F. A passive shock absorbing system, such as coil spring S is located between the frame F and the carrier C for the wheel W. Additionally, in a manner similar to that described above for the active attenuation actuator 203, a hydraulically activated actuator system 303 is provided on a support frame 300 above the wheel carrier C and the coil spring S. Thus, the wheel carrier C will serve as the anchor for an actuator support frame 300 similar to the frame 207, 208, 209 in the FIG. 4 embodiment.

Just as in the engine mount embodiment of FIGS. 4 to 6, the active cancelling actuator of FIG. 7 is operative outside of the force transfer chain through the passive element S. Further, the actuator 303 need only respond to the vibration movements and need not support the basic static engine load which is transmitted through the spring connection S between the frame F and wheel carrier C.

Although the invention has been described and illustrated in detail, it is to be clearly understood that the same is by way of illustration and example, and therefore is not to be taken by way of limitation.

Accordingly, all alterations, modifications and changes coming within the spirit and scope of the invention as defined by the appended claims are herein meant to be included.

I claim:

1. Apparatus for isolating and attenuating vibrations between first and second members comprising:
    passive vibration absorbing means located between the first and second members for absorbing forces including forces along a first axis; and
    axis vibration inducing means for applying active isolating vibration forces in response to detected relative vibration between said first and second members, said active vibration inducing means further comprising,
    a support mount frame attached to the second member, and
    an actuator located on the support mount frame adjacent the first member for applying said active vibration isolation forces along the first axis to said apparatus along with vibration isolation forces provided by the passive vibration absorbing means, said actuator and passive vibration absorbing means being collectively disposed between said second member and said support mount frame with said first member mounted therebetween,
    said an actuator additionally including a housing and a resilient diaphragm separating a pair of opposed fluid chambers contained within said housing.

2. The apparatus as defined by claim 1 wherein said actuator applies said active vibration isolating forces in parallel within the isolation forces provided by the passive vibration absorbing means.

3. The apparatus as defined by claim 2 wherein said active forces are applied to said first member.

4. The apparatus as defined by claim 1, wherein said passive vibration absorbing means includes resilient means located between the first and second members.

5. The apparatus as defined by claim 2 wherein said first member is coupled to a vehicle frame and said second member is coupled to a vehicle wheel carrier assembly.

6. The apparatus as defined by claim 5 wherein said wheel carrier assembly comprises a suspension spring assembly.

7. The apparatus as defined by claim 6 wherein said suspension spring assembly includes a coiled suspension spring.

8. Apparatus for isolating and attenuating vibrations between first and second members comprising:
    passive vibration absorbing means located between the first and second members for absorbing forces including forces along a first axis; and
    active vibration inducing means for applying active isolating vibration forces in response to detected relative vibration between said first and second members, aid active vibration including means further comprising,
    a support mount frame attached to the second member, and
    an actuator located on the support mount frame adjacent the first member for applying said active vibration isolation forces along the first axis to said apparatus along with vibration isolating forces provided by the passive vibration absorbing means,
    said actuator additionally including a housing and a resilient diaphragm separating a pair of opposed fluid chambers contained within said housing,
    said passive vibration absorbing means including means for securing said resilient means between said first and second members at the second member, said means including flange means located between the other end of said first member and said second member.

9. The apparatus as defined by claim 8, wherein said actuator is supported by the support mount frame.

10. The apparatus as defined by claim 9, wherein said support mount frame is constructed as a frame surrounding the actuator and including a pair of mutually spaced apart mounting plates, one of which is secured to said second member, and a plurality of generally equally spaced rods or bolts extending between said plates and around said actuator.

11. The apparatus as defined by claim 10, wherein said first member is coupled to a vehicle internal combustion engine and said second member comprises a portion of a vehicle frame.

12. Apparatus for isolating and attenuating vibrations between first and second members comprising:

passive vibration absorbing means located between the first and second members for absorbing forces including forces along a first axis; and active vibration inducing means for applying active isolating vibration forces in response to detected relative vibration between said first and second members, said active vibration inducing means further comprising, a support mount frame attached to the second member, and an actuator located on the support mount frame adjacent the first member for applying said active vibration isolating forces to said apparatus along with vibration isolation forces provided by the passive vibration absorbing means, said actuator additionally including a housing and a resilient diaphragm separating a pair of opposed fluid chambers contained within said housing, said support mount frame including a top plate, a bottom plate, and a plurality of elongated connecting means connecting the top and bottom plates together to form a rigid frame, and wherein said actuator includes a hydraulically actuated member supported in a housing attached to the top plate and being coupled to a top part of the first member.

13. The apparatus as defined by claim 12 wherein said support mount frame is attached to said second member at a plurality of points located symmetrically with respect to the first axis which acts as a center line of force transfer movement of the active vibration inducing means and wherein said actuator is coupled to said first member along said center line of force transfer.

14. The apparatus as defined by claim 13 wherein said first member is coupled to an engine mounted on a frame of a motor vehicle and said second member comprises said frame of the vehicle.

* * * * *